March 9, 1965 E. G. PICKELS 3,172,293
DISPENSING PIPETTE
Filed June 14, 1961
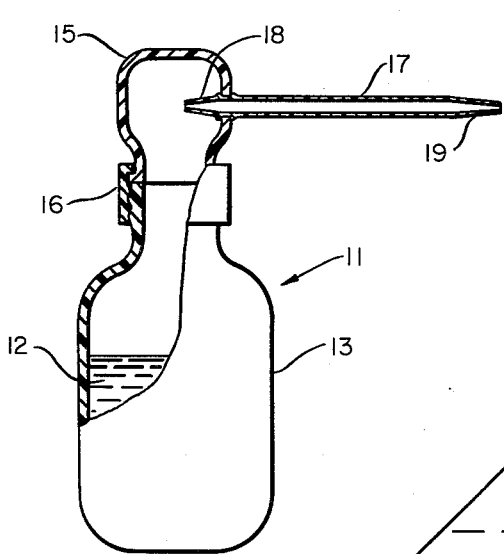
FIG. 1
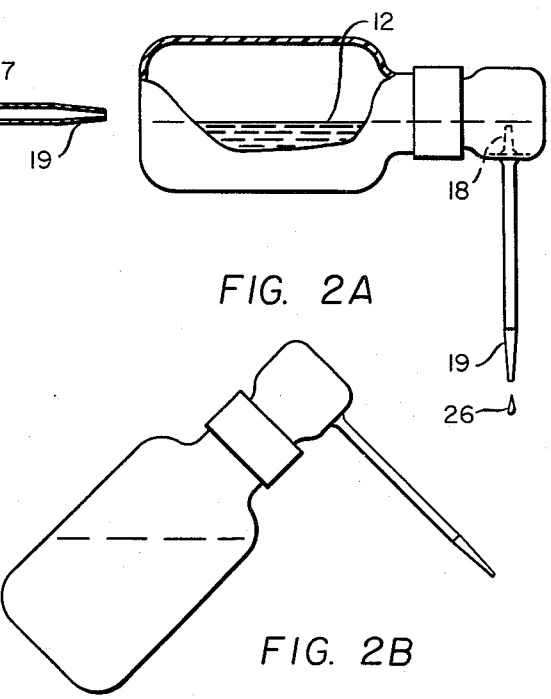
FIG. 2A
FIG. 2B
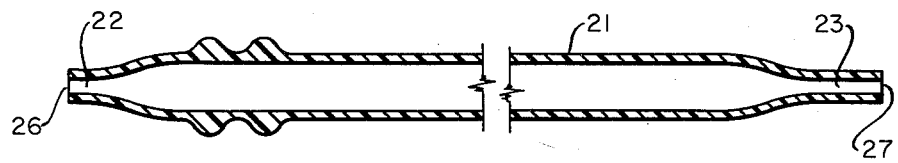
FIG. 3
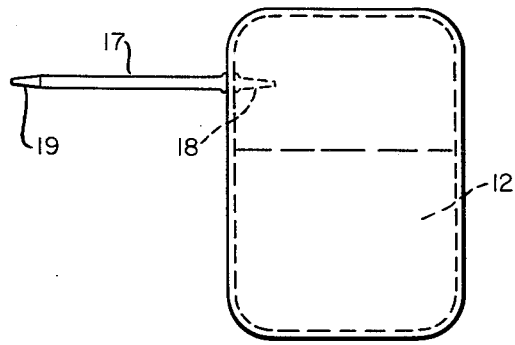
FIG. 4
EDWARD G. PICKELS
*INVENTOR.*
BY
*Flehr and Swain*
ATTORNEYS

United States Patent Office 3,172,293
Patented Mar. 9, 1965

3,172,293
DISPENSING PIPETTE
Edward G. Pickels, Atherton, Calif., assignor to Beckman Instruments, Inc., a corporation of California
Filed June 14, 1961, Ser. No. 117,119
4 Claims. (Cl. 73—425.6)

This invention relates generally to dispensing pipettes and more particularly to dispensing pipettes for the delivery of successive measured quantities of liquid.

In laboratory work, particularly analytical chemistry, pipettes are used to transfer predetermined quantities of liquid. In many applications it is important that the predetermined quantities of liquid transferred be extremely accurate and not vary from one operation to the next. In short, it is desirable that the pipette be capable of reproducing the predetermined volume transferred.

One type of dispensing pipette of the prior art includes a deformable vessel provided with a dome. A stand pipe communicates between the vessel and dome. A pipette capable of retaining predetermined quantities of liquid between its ends extends into the dome. Valving means are provided whereby upon a first application of pressure to the vessel, the liquid rises in the stand pipe, submerges the end of the pipette, and fills the pipette. Upon reduction of pressure, the liquid flows back into the vessel. Upon a subsequent application of pressure, the liquid is delivered from the pipette.

Either automatic or manual valving means is required to carry out the foregoing operation. In manual valving, an opening is formed in the dome which is opened and closed with the finger of the operator. In general, the manipulations required for manually operating the pipette require a certain degree of skill. The differential pressure required to operate an automatic valve must be less than the differential pressure required to withdraw sample from the pipette. Such valves become complicated and subject to malfunction.

It is a general object of the present invention to provide a pipette which is simple in construction and easy to operate.

It is another object of the present invention to provide a dispensing pipette which is not subjected to spillage or which does not endanger an operator operating the same.

It is still a further object of the present invention to provide a dispensing pipette in which the liquid to be dispensed is retained in a closed vessel with the only opening in the vessel being the opening through which the pipette extends.

It is another object of the present invention to provide a pipette which can be used both as a dispensing and a sample pipette.

These and other objects of the invention will become more clearly apparent from the following description when taken in conjunction with the accompanying drawing.

Referring to the drawing:

FIGURE 1 schematically illustrates a pipette in accordance with one embodiment of the invention;

FIGURES 2A and 2B illustrate operation of the pipette;

FIGURE 3 shows a suitable pipette for use in the dispensing pipette assembly; and FIGURE 4 shows another embodiment of the invention.

Referring to the figures, the dispensing pipette comprises a deformable vessel made of resilient material generally designated at 11. The vessel is adapted to retain liquid sample 12. The vessel illustrated includes a lower or bottle portion 13, and an upper or a dome portion 15. A threaded cap 16 holds the dome on the neck of the bottle 13. A suitable seal is formed whereby the interior of the vessel is closed from the surrounds.

A measuring pipette 17 has one end 18 extending into the dome and the other end 19 extending outwardly therefrom and providing the sole communication with the surrounds. Referring particularly to FIGURE 3, a suitable pipette is shown. The pipette may, for example, comprise a cylindrical body portion 21 which retains a major portion of the predetermined volume of liquid. Spaced capillary passages 22 and 23 are disposed on each end of the body portion. It is, of course, to be understood that to measure different volumes of liquid, either the body portion 21 can be lengthened or shortened, or its diameter can be varied. In any event, the liquid contained between the meniscuses 26 and 27 formed at the ends of the capillary passages 22 and 23 is the predetermined measured volume desired.

The pipette is preferably made of a non-wettable material such as polyethylene whereby the meniscuses are well defined and do not extend a considerable distance along the walls of the pipette.

In operation as a dispensing pipette, the pipette is tilted so that the liquid 12 submerges the end 18 of the measuring pipette as illustrated in FIGURE 2A. Pressure is then applied to the interior of the vessel by deforming the bottle or vessel 13. This causes the liquid to flow into the measuring pipette and fill the same.

As soon as liquid is observed dropping from the end 19 as, for example, one drop 26, application of pressure is terminated and the vessel tilted back as shown in FIGURE 2B. The pressure is then reduced as, for example, by releasing the bottle. The predetermined measured quantity of liquid is retained within the measuring pipette by forces due to the liquid meniscuses at the tips of the capillary provided the reduced pressure created within the vessel due to the liquid displaced is less than the pressure associated with the capillary forces. To dispense the liquid, a pressure sufficient to overcome the pressure associated with the capillary forces is applied with the inner end of the pipette free of liquid.

In order that release of pressure on the bottle 12 does not withdraw liquid which is forced into the pipette, a minimum volume of air must exist. In general, the difference in volume between the volume of the vessel and liquid should be such that the differential pressure between the outside and inside of the vessel created by filling the pipette 17 is less than the differential pressure required to overcome the capillary forces of the liquid. In general, the differential pressure required to dispense liquid from the pipette can be controlled to some extent by selecting capillary passages of different diameters to thereby control the capillary forces. In general, small tips give rise to greater capillary forces.

The pipette may be used as a sampling pipette to sample measured quantities of liquid. In operation, the vessel is deformed by application of pressure to displace air. The tip of the measuring pipette is then placed in the liquid to be sampled. While the tip is held immersed in the liquid, the pressure is slowly relaxed to reduce the air pressure within the vessel and draw liquid into the pipette. When the pipette is filled, the relaxation is discontinued to substantially sustain the pressure. The vessel is squeezed to deliver the sample. It will be seen that small variations in pressure will not deliver or draw sample from the measuring pipette since there is a considerable volume of air present, any consequent changes in pressure will not exceed the capillary retaining forces.

Referring to FIGURE 4, a vessel of another configuration is schematically illustrated. The vessel shown in FIGURE 4 is a completely sealed vessel which can be pre-filled with liquid 12. The pipette 17 has the end 18 extending into the vessel and the dispensing end 19 extending away from the vessel. Operation is as previously described.

I claim:

1. A pipette for the measurement and delivery of predetermined volumes of liquid comprising a deformable bottle-like, closed vessel having resilient walls, a measuring pipette having first and second ends carried by the wall of the vessel with the first end communicating with the interior of the vessel and the second end providing at all times the sole communication between said interior and outside surroundings, said first end being carried by said wall to be disposed above the surface of liquid in said storage vessel during deformation of said vessel to apply air pressure to said first end, said second end being disposed in a plane considerably below said first end during deformation of said vessel to dispense liquid in a downwardly direction from said measured pipette to the exclusion of liquid carried in said storage vessel.

2. A pipette for the measurement and delivery of predetermined volumes of liquid comprising a deformable vessel having resilient walls, a measuring pipette, having first and second capillary ends, carried by a wall of the vessel with the first end communicating with the interior of the vessel and the second end providing the sole communication between said interior and the outside surroundings, said pipette serving to retain by capillary forces a measured quantity of liquid between the meniscuses formed at its first and second ends, said vessel being resiliently deformable by squeezing to expel air therefrom via said pipette, said first end being disposed to receive a suction applied thereto by relaxation of the vessel from a deformed condition, said second end being adapted to be dipped into a liquid during application of said suction to said first end to draw said measured quantity of said liquid into said pipette and liquid in excess thereof into said vessel, said first end being disposed to isolate said measured quantity from the excess quantity while deforming said vessel to develop a pipette-purging air pressure applied to said first end, said vessel having a free air volume such that slight changes in the vessel volume will not create pressure differentials between the interior of the vessel and the outside surroundings greater than the capillary forces retaining the liquid within the pipette.

3. A pipette for delivery of measured volumes of liquid comprising a closed vessel forming a single substantially unobstructed chamber, a liquid which is to be delivered contained in said vessel, said vessel having a predetermined minimum air space above the liquid, a measuring pipette capable of retaining between its ends a predetermined volume of liquid, said pipette having one end extending into the interior of the vessel, said interior being in fluid communication with the outside surroundings solely via said pipette, said minimum air space having a volume such that the pressure differential between the outside surroundings and the interior of the vessel created by filling the pipette is less than the pressure required to withdraw liquid from the pipette.

4. A dispensing pipette for delivery of measured volumes of liquid comprising a closed deformable storage container having a predetermined storage volume, a predetermined liquid volume, measured volumes of which are to be delivered, stored in said container, a measuring pipette having its ends terminating in capillary passages and capable of retaining between its ends one of said measured volumes of liquid, said pipette having one end extending into the interior of the closed storage container, said interior being in fluid communication with the outside surroundings solely via said pipette, said one end being disposed with respect to the surface of the liquid stored in the container to maintain the surface thereof, during delivery of a measured volume from said pipette, at a level below said one end while permitting said storage container to be deformed to compress air disposed between said measured volume in said pipette and liquid in said storage container to develop and apply a pipette-purging air pressure to said measured volume of liquid in the pipette, the difference between said liquid volume and said storage volume being such that the differential pressure created between the exterior and interior of the vessel by filling the pipette with liquid stored in the container is less than the capillary pressure of the liquid within the pipette so that the liquid in the pipette is not withdrawn from the pipette into the storage container by the differenial pressure, said pipette being carried by said container to dispose said one end at a level considerably above the other end during delivery of said measured volume to permit the last named end to dispense in a downwardly direction.

References Cited in the file of this patent

UNITED STATES PATENTS 2,974,528    Sanz _____ Mar. 14, 1961
3,045,494    Gerarde _____ July 24, 1962

OTHER REFERENCES

Kirk: Quantitative Ultramicro Analysis, John Wiley & Sons Inc., New York, 1950, pages 24 and 25.